Figures 1, 2:
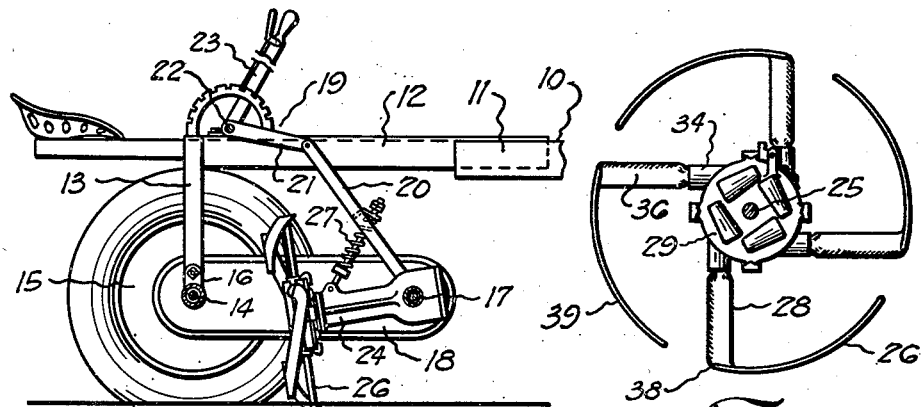

Nov. 27, 1945. L. W. LEEPER 2,389,790

REVOLVING CHOPPER

Filed May 20, 1944 3 Sheets-Sheet 1

Inventor
Lawrence W. Leeper

By Jack A. Ashley
Attorney

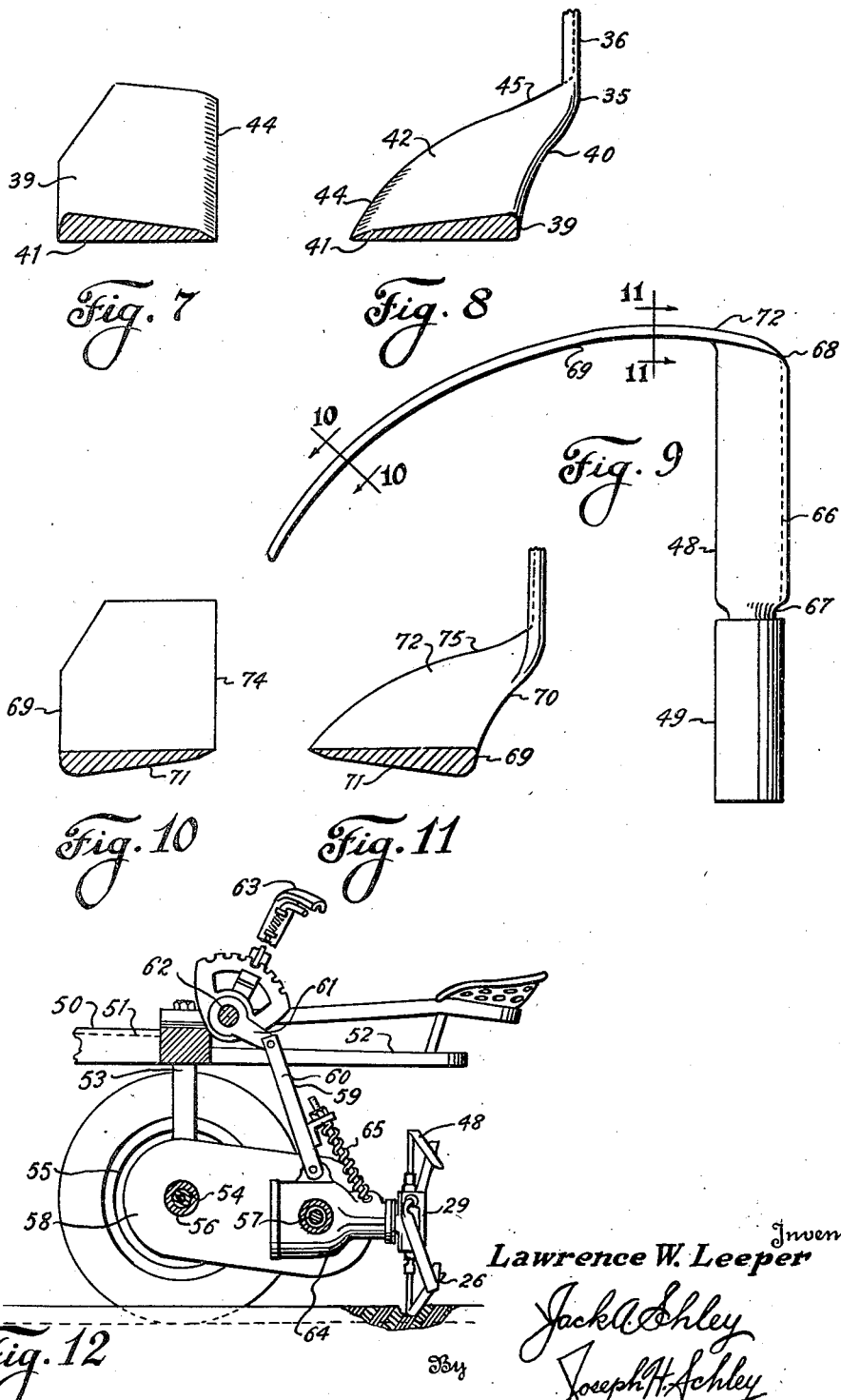

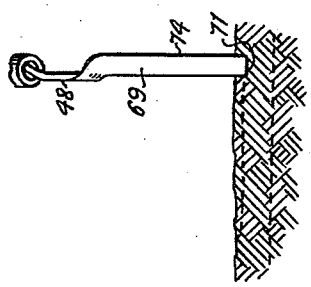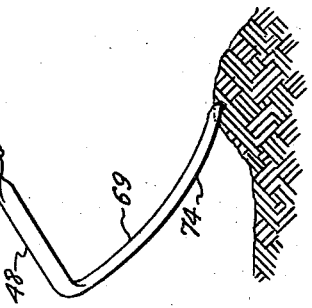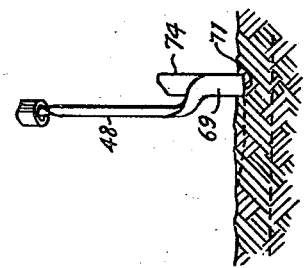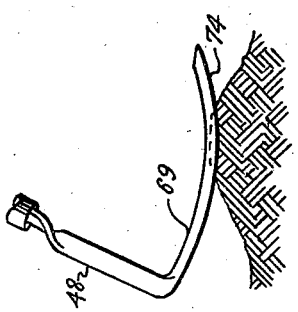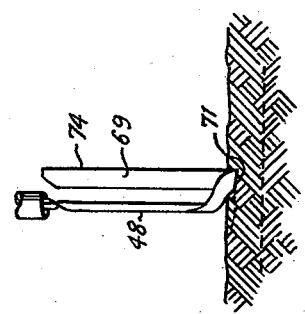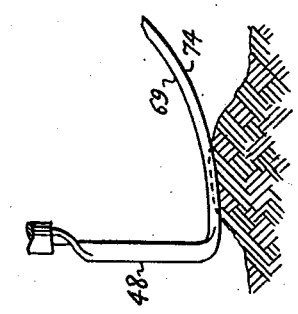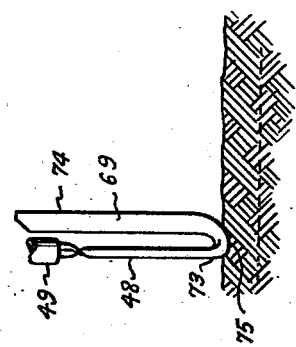
Inventor
Lawrence W. Leeper Patented Nov. 27, 1945

2,389,790

UNITED STATES PATENT OFFICE 2,389,790

REVOLVING CHOPPER

Lawrence W. Leeper, Dallas, Tex.; Naomi Kerrick Leeper executrix of said Lawrence W. Leeper, deceased Application May 20, 1944, Serial No. 536,455

8 Claims. (Cl. 97—213)

This invention relates to new and useful improvements in revolving choppers.

One object of the invention is to provide an improved chopper which is primarily adapted for use in chopping or thinning out crops planted in rows, such as cotton, sugar beets, young corn and other similar plants, the chopper being designed to chop out successive portions of the plants in a row without injuring the plants left standing, whereby a more luxurious and greater growth of the remaining plants as well as an earlier maturity thereof is promoted.

An important object of the invention is to provide an improved revolving chopper having a plurality of cutters, each of which includes an arm tangential to the axis of the chopper and an arcuate circumferential blade constructed and disposed so that the blade is swung into engagement with the ground in such a manner as to enter the soil with a minimum impact and to slice therethrough with minimum resistance, whereby undue disrupting of the soil and disturbing of the adjacent standing plants or their roots is prevented and a moisture-retaining mulch is created between said standing plants.

Another object of the invention is to provide an improved revolving chopper wherein the cutting elements are held rigidly in a set position, the adjustment of which may be varied, thereby making possible an increase or decrease of the width of the uncut portions of the rows as well as varying the width of the swath or gap cut by the blade.

A particular object of the invention is to provide an improved revolving chopper, of the character described, wherein the blade of each cutting element is curved adjacent the juncture of said blade with the arm of the element to provide a substantially transverse, curved cutting edge which serves to merge the cutting action of the arm with that of the blade, whereby said blade will enter the soil with a true slicing action so as to eliminate undue impaction and upheaval of said soil.

A further object of the invention is to provide an improved revolving chopper, of the character described, wherein the blade of each cutter is so constructed and is disposed in such a manner relative to the ground that each successive portion of said blade will substantially follow the path transversed by the preceding portion thereof and will tend to move upwardly out of the soil, whereby the position of the point of contact of the blade relative to said soil tends to remain constant or unchanged and embedding or digging in of said blade is prevented.

A construction designed to carry out the invention will be hereinafter described together with other features of the invention.

Figure 3:
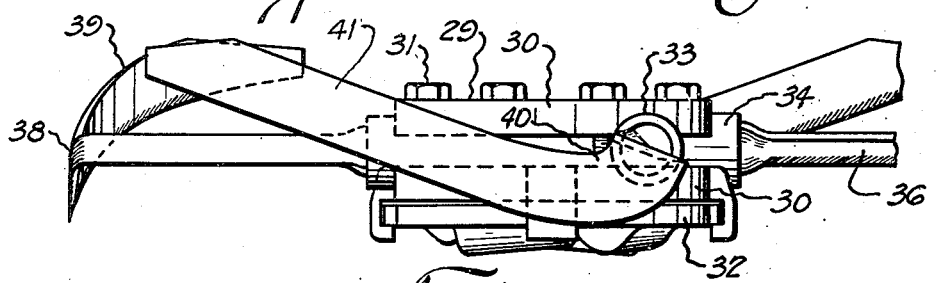
Figures 4, 5, 6:
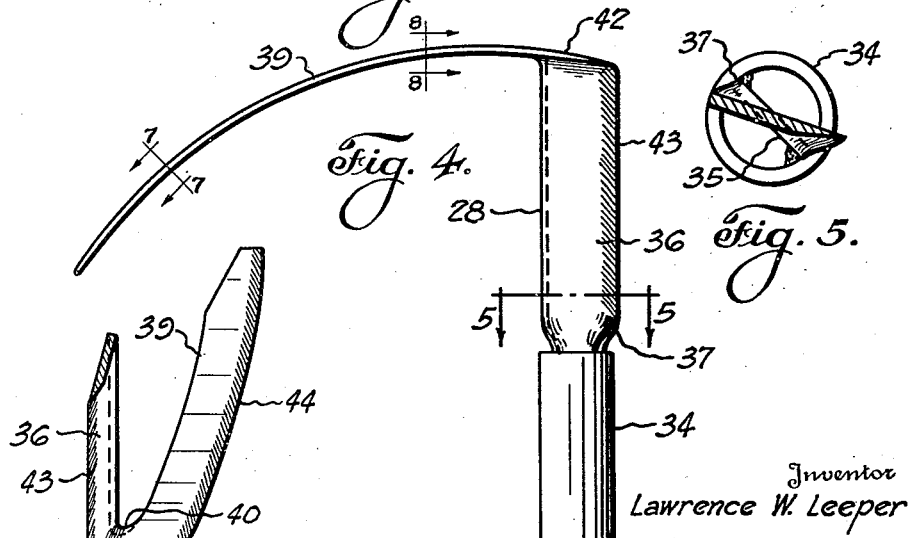

The invention will be more readily understood from a reading of the following specification and by reference to the accompanying drawings, wherein an example of the invention is shown, and wherein:

Figure 1 is longitudinal, vertical, sectional view of a crop-spacing machine having a revolving chopper, constructed in accordance with the invention, mounted thereon, Figure 2 is an enlarged end elevation of the chopper, Figure 3 is an enlarged plan view of a portion of the chopper, showing the mounting of the cutting elements in the hub and the relationship of said cutting elements to each other, Figure 4 is an elevation of one of the cutting elements, Figure 5 is a horizontal, cross-sectional view, taken on the line 5—5 of Figure 4, showing the twist of the arm of the cutting element, Figure 6 is an isometric view of the outer portion of one of the cutting elements, showing the curved cutting edge formed adjacent the juncture of the blade and arm thereof, Figure 7 is a transverse, vertical, sectional view, taken on the line 7—7 of Figure 4, Figure 8 is a similar view, taken on the line 8—8 of Figure 4, Figure 9 is an elevation of a slightly modified form of cutting element, Figures 10 and 11 are transverse, vertical, sectional views, taken on the lines 10—10 and 11—11, respectively, of Figure 9, Figure 12 is a longitudinal, vertical, sectional view of a crop-spacing machine having the modified cutting elements mounted upon its revolving chopper, Figures 13 through 16 are diagrammatic side views of the modified cutting element, showing its various positions relative to the soil, and Figures 17 through 20 are elevations of the cutting element, similar to Figures 13 through 16, respectively.

This application is filed as a continuation-in-part of my co-pending application, Serial No. 433,843, filed on March 9, 1942, as a division of my prior application which matured as United States Letters Patent No. 2,275,446, issued March 10, 1942.

In the drawings, the numeral 10 designates a crop-spacing machine having the usual chassis 11 which includes a longitudinal frame 12, upright vertical braces 13, an axle 14 and wheels 15. The lower end of the upright braces 13 are pivotally connected to suitable bearing collars 16 within which the axle 14 is journaled. A short, transverse shaft 17 is disposed forwardly of the axle 14 and is connected to said axle by a suitable gear mechanism 18, such as is illustrated in the above Letters Patent, whereby the shaft will be rotated whenever the wheels and axle are turned by movement of the machine. For raising and lowering the shaft 17, a lifting assembly 19 is connected thereto and includes a yoke or lifting fork 20, a pivoted link or arm 21, a transverse shaft 22 and an operating lever 23. A gear box or housing 24 is carried by the shaft 17 and includes a longitudinal shaft 25, as shown in Figure 2, having a revolving chopper or cutting device 26 mounted upon its outer or free end, whereby rotation of said shaft 17 will revolve the shaft 25 of the chopper. For supporting the rear end of the gear box 24 and the chopper 26, the rear end of said gear box is secured to a spring-pressure rod or hook 27 which depends from the yoke 20.

The chopper 26 includes a plurality of angular cutting elements 28 and an annular hub 29 which is keyed or otherwise secured to the shaft 25. As is clearly shown in Figures 2 and 3, the hub 29 consists of a pair of annular plates 30 which are fastened together by suitable bolts 31. Although the plates 30 have been illustrated as being removably latched by co-acting lugs and keepers to a third annular plate 32 which is keyed to the shaft 25, in the manner shown in the aforesaid Letters Patent No. 2,275,446, it is manifest that the plates could be secured directly to said shaft by a shear pin as is also shown in said Letters Patent. A plurality of semi-cylindrical grooves or recesses 33 are formed in the contiguous surfaces of the plates 30 and extend substantially at a tangent to the periphery of their respective plates. Since the grooves complement each other when the plates are fastened together, sockets are provided for receiving tubular sleeves or collars 34. Each cutting element 28 is provided with a reduced shank 35 which engages within and is welded or otherwise secured to one of the sleeves 34, as is clearly shown in Figure 5, whereby the elements are fastened to the hub 29 when said sleeves are clamped within the sockets.

Each cutting element includes a substantially flat arm 36 which is made integral with the shank 35 and which may be twisted relative to said shank as shown at 37. Obviously, the arm projects substantially tangentially from the hub. At the outer end of the arm, the element is bent sharply or abruptly forwardly upon itself and at substantially a right angle, as indicated at 38, to form a cutting blade 39. This blade is arcuate or curved so as to coact with the other blades to form an intercepted or mutilated circular chopper or cutting device, the blades being struck upon identical arcs concentric to the axis of the chopper 26. As is illustrated in Figure 3, the blade 39, in addition to being bent forwardly substantially at a right angle to the vertical axis of the arm 36, is sharply curved laterally or rearwardly at substantially a right angle to the forward face of said arm adjacent to its juncture with the arm, as shown at 40, without materially altering the concentric arc upon which said blade is struck. The outer or under surface of each blade is flat in transverse section, as shown at 41 (Figs. 7 and 8), whereby the entire area of said under surface is spaced substantially the same radial distance from the axis of the chopper. It is pointed out that the curved portion 40 is preferably flattened longitudinally, as indicated at 42 in Figures 4 and 8, so as to be disposed in a plane at substantially a right angle to the plane of the arm 36 as well as the plane of the angle 38. Due to the curve 40, the remaining portion of the blade extends or is directed substantially parallel to the vertical plane of the arm, thereby disposing the free end of said blade rearwardly of said arm when the cutting element 28 is positioned as shown in Figures 1 and 3. The advance or leading edges of each arm and blade are reduced or sharpened to form cutting edges 43 and 44, respectively, so as to facilitate their entry into the soil or hill being cultivated, the inner or upper surface of the blade being tapered or inclined downwardly toward its sharpened advance edge (Figs. 7 and 8).

By the particular formation of the cutting element, the pitch of the blade 39 is flattened to the extent that said blade will enter the ground with a true slicing action and pass therethrough with a minimum drag or resistance. It is also pointed out that the arm 36 is disposed at such an angle as to coact with the blade in producing the above cutting action. By reason of the sharp bending of the blade from the arm at 40, a substantially transverse, curved cutting edge 45 is provided at the forward, inner portion of said blade (Figure 6) and this cutting edge acts to merge the cutting action of the arm with that of the blade as well as to provide a slicing entry of said blade into the soil. The formation of the cutting element and the continuity of the cutting edges 43 and 44 is such that, upon revolution of the chopper, a smooth and continuous entry of said cutting edges is provided, thereby eliminating undue impaction and upheaval of the soil.

The free end of one blade terminates short of and is spaced from the adjacent blade, the distance or space between the blades determining the width of the uncut swath. By rotating the sleeves 34 within their respective sockets, this distance may be varied to control the width of the uncut swath. As the cutting elements are revolved during forward movement of the machine, it will be seen that the curved cutting edge 45 of each blade will contact the earth first, and will be followed by the leading edges 43 and 44 of the arm and blade. Since the machine is moving forwardly at the same time the blade is revolving, said blade will enter the row or hill being cultivated at an angle to the longitudinal axis of the row or hill, whereby a slicing action is produced. Of course, the sharpened leading edges of each blade and arm facilitate the entry of the blade, and thus a preliminary shearing is effected. Continued revolution of the cutting element, as well as continued forward movement of the machine, causes the remainder of the blade to follow through after the leading edges and thereby complete the cutting action.

In operation, the driving mechanism with its gear box 24 and the revolving chopper 26 is lowered to the position shown in Figure 1 by swinging the lever 23 forwardly. This will cause the cutting elements 28 of the chopper to engage and bite into the hill of the row to be cultivated. Forward movement of the crop spacing machine on its wheels 15 will cause the transmission of such movement from its axle 14, through the gear mechanism 18 and shafts 17 and 25, to the revolving chopper so as to rotate the same in a clockwise direction (Fig. 2). This revolution of the chopper will continue as long as the machine travels forwardly, whereby the elements 28 of said chopper will enter the ground obliquely to the line of movement of said machine. The flat, curved portion 42, arm 36 and curved blade 39 of such element will enter the ground with little or no resistance due to the construction thereof and the sharpened edges 45, 43 and 44 so as to create a pulverized condition of the top soil. In cutting or slicing through the earth, the blade will loosen the same and cut therebeneath, thereby permitting said earth to fall behind said blade and produce an effective mulch. The latter not only holds moisture but also prevents the roots of the plants from being exposed to nature's elements.

As shown in Figure 1, the gear box 24 extends rearwardly and slightly downwardly when the chopper is in its operating position so as to dispose said chopper at a forward and slightly downward inclination relative to the ground or soil. This causes the outer or under surface 41 of each blade 39, which is flat in transverse section and parallel to the axis of the cutter to assume an upward and forward inclination or pitch. Thus, upon rotation of the chopper each blade will have a tendency to move upwardly and outwardly through the soil, whereby said blade is prevented from becoming embedded or cutting deeper into the soil and the contour of said soil remains substantially unaltered after the blade has passed therethrough. It is manifest that the shearing or slicing action of each blade is, in part, due to the flat, curved portion 42 and the contour of its outer or under surface 41 which cause said blade to substantially follow the path cut by the leading edges and which prevent digging in or further embedding of the blade.

As shown in Figures 9 through 12, angular cutting elements 48 of slight modification may be substituted for the cutting elements 28 and may be carried by the chopper 26 in a similar manner. The chopper with the modified cutting elements may be mounted upon either the machine 10 or upon a slightly different type of machine 50, the chassis 51 of which includes a longitudinal frame 52, upright vertical braces 53, an axle 54 and wheels 55 (Fig. 12). The braces 53 have their lower ends connected to suitable bearing collars 56 within which the axle 54 is journaled. A short, transverse shaft 57 is disposed rearwardly of the axle and is connected thereto by suitable drive mechanism 58. The position of the shaft 57 is controlled by a lifting assembly which includes a yoke 60, a pivoted link 61, a transverse shaft 62, and an operating lever 23. A horizontal gear box or housing 64 is carried by the shaft 57 and includes a longitudinal shaft (not shown) upon the free or outer end of which the revolving chopper 26 is adapted to be mounted. The rear end of the gear box 64 and the chopper are supported from the yoke 60 by a spring-pressure rod 65. From the foregoing, it is manifest that the machine 50 is similar to the machine 10 and that the chopper with the modified cutting elements may be mounted upon and operated by either machine or other vehicle; provided the chopper is disposed in an upright or vertical plane.

The angular cutting elements 48 are substantially identical to the cutting elements 28, with the exception of the blades thereof, and each of the former includes an arm 66 tangential to the axis of rotation with its reduced shank 67 engaging within a suitable tubular sleeve 49 for fastening to the hub 29 of the chopper. At the outer end of the arm, the element 48 is bent upon itself at substantially a right angle as shown at 68 to form a curved cutting blade 69 which is curved laterally or rearwardly at 70, similar to the curve 40 of the blade 39. The outer or lower surface of each blade 69 has an upward and forward pitch or is inclined upwardly toward the advance or leading edge of said blade as shown at 71 in Figures 10 and 11, while upper or inner surface of the blade is flat in transverse section so that the entire area of said upper surface is spaced substantially the same radial distance from the axis of the chopper. Thus, the surfaces of the blade 69 are reversed from those of the blade 39 and permit the chopper to be mounted in a vertical plane or perpendicular to the ground as is shown in Fig. 2. Aside from the disposition of the surfaces of the blade 69, the cutting elements 48 are of the same construction as the cutting elements 28 and include flat, curved portions 72, formed by the curves 70, sharpened advance or leading edges 73 and 74 of the arms and blades and transverse, curved cutting edges 75.

Manifestly, the action of the cutting elements 28 and 48 is substantially identical and, due to the different inclinations of the blades, the chopper may be mounted at different inclinations as illustrated in Figures 1 and 12, respectively. It is pointed out that both cutting elements are so constructed and positioned that the same will enter and pass through the soil with minimum resistance, there being a true slicing action rather than a chopping action. In Figures 13 through 20, the various positions of the cutting element 48 in entering and passing through the soil have been illustrated. Of course, these illustrations apply also to the cutting element 28 with the exception of the forward and downward inclination thereof. The cutting element will enter the side of the hill and the transverse, curved cutting edge 75 will be the first portion of said element to engage said hill (Figs. 13 and 17), being closely followed by the sharpened edge 73 of the arm. As has been explained, these edges cut a path for the blade 69 and initially penetrate the soil or hill to the desired depth. Due to the constant, unchanging arc of the blade, there is no deeper penetration and each portion of said blade moves through the soil at substantially the same depth or in the same horizontal plane (Figs. 18 through 20). As the blade moves through the soil, it will travel forwardly or longitudinally of said hill away from the original cut or swath (Figs. 14 through 16). However, such forward or longitudinal travel will be controlled largely by the speed of rotation of the chopper and the angular position of the cutting element relative to said chopper. Of course, the amount of forward travel is predetermined in accordance with the nature of the crop being thinned and the rotational speed of the chopper, such travel being facilitated by the sharpened edge 74 of the blade. Attention is directed to the fact that the upwardly and forwardly inclined outer or lower surface 71 of the blade permits the latter to slide through the soil during its forward travel without any increased penetration or embedding thereof. It is noted that the crop-spacing machine may be provided with two or more revolving choppers instead of one in order to chop two or more rows at one time. Obviously, a machine having a plurality of revolving choppers would be advantageous when the crop has been sown with a multiple row planter. Obviously, the choppers could be mounted upon a tractor or other vehicle and the rotative power obtained from a source other than the ground wheels.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A revolving chopper for an agricultural machine including a hub, a plurality of chopping elements each including a flat arm and an arcuate cutting blade, and means for securing the arms to the hub, each blade being bent acutely and forwardly of its flat arm at the outer end of said arm to provide a continuous cutting edge running with the blade in an arc of constant radius from the hub and also curved transversely in the arc of the blade in front of the arm, whereby the blade at the juncture with the arm presents a cutting edge in the same arc as the entire cutting edge of said blade to cause the blade to enter and slice clearly through the soil in a continuous unbroken arc.

2. A revolving chopper as set forth in claim 1, wherein one transverse surface of the blade is substantially parallel to the axis of revolution of the chopper and the other transverse surface of said blade is moderately inclined from the cutting edge thereof to produce a thin slice through the soil.

3. A revolving chopper as set forth in claim 1, wherein each arm is provided with a cutting edge in continuity with the cutting edge of its blade.

4. A chopping element for a revolving chopper including, a flat arm, an arcuate blade bent sharply from one end of the arm having an elongate cutting edge, said edge having a portion in front of the arm curved toward the arm at a tangent to its remainder and in the same arc, whereby the blade presents to the soil an entrance edge in the same arc as the remainder of its cutting edge and said entrance edge is free from obstruction.

5. A chopping element for a revolving chopper including, a flat arm having a twisted shank at one end, a sleeve in which said shank is secured, and an arcuate cutting blade bent sharply from the other end of said arm.

6. A revolving chopper for an agricultural machine including, a hub, a plurality of circumferentially disposed arcuate blades, a shaft axially supporting the hub, a plurality of flat arms extending from the hub in offset relation to the shaft and relatively at tangents to the shaft, each of said blades being bent sharply from one of the arms and having a cutting edge extending from the advance edge of the arm in an arc of constant radius from the shaft.

7. A chopping element for a revolving chopper including, a flat arm, and an arcuate blade bent sharply from said arm and having a cutting edge extending in an arc of constant radius from one edge of the arm to the outer end of the blade, the blade having an upper transverse surface substantially parallel to the line of forward movement of the chopper and a transverse under surface moderately inclined from the cutting edge of said blade.

8. A chopping element for a revolving chopper including, a flat arm, an arcuate blade bent sharply from said arm and having a cutting edge extending in an arc of constant radius from one edge of the arm to the outer end of the blade, the blade having an upper transverse surface substantially parallel to the line of forward movement of the chopper and a transverse under surface moderately inclined from the cutting edge of said blade, the arm having a twisted shank, and a sleeve in which the shank is secured.

LAWRENCE W. LEEPER.